Sept. 22, 1959 M. CANEPA 2,905,933

MAGNETIC DRUM STORAGE UNIT

Filed July 9, 1957 2 Sheets-Sheet 1

INVENTOR.
MICHELE CANEPA
BY
Kenyon & Kenyon
ATTORNEYS

MAGNETIC DRUM STORAGE UNIT

Filed July 9, 1957 2 Sheets-Sheet 2

INVENTOR.
MICHELE CANEPA
BY
Kenyon & Kenyon
ATTORNEYS 2,905,933

MAGNETIC DRUM STORAGE UNIT

Michele Canepa, South Norwalk, Conn., assignor to Olivetti Corporation of America, New York, N.Y., a corporation of Massachusetts Application July 9, 1957, Serial No. 670,827

7 Claims. (Cl. 340—174)

The present invention relates generally to magnetic drum storage units adapted for use as memory devices in electronic computers, and more particularly to improved magnetic head assemblies and mechanisms for individually adjusting the positions of the heads relative to the rotating drum.

In computing machine operations, it is necessary to store information in interpretable form for later reference. Magnetic storage drum units are commonly used for recording and reading digital information. In the magnetic recording process, a magnetic carrier is caused to move past the gap of a recording head which is a suitably designed electromagnet energized by signal currents. Each element of the carrier is successively brought into a definite magnetized state in which it tends to remain upon leaving the recording field. The recorded pattern of remanent magnetization along the carrier is related to the time variation of the signal current and this pattern may be read by conveying the carrier past the gap of a reproducing or play-back head which may be similar to the recording head.

Efficiency of magnetic coupling between the carrier and the head, and also sharpness of resolution are more easily attained if the pole pieces of the recording head are maintained in physical contact with the carrier. But contact recording is feasible only if the linear speed of the carrier is relatively low, for otherwise due to high speed passage of the carrier abrasion at the head will damage both head and carrier. However, since digital recording calls for high linear speeds, contact recording is not practical and it is essential, therefore, that a small head-to-carrier clearance be maintained. This clearance is critical in nature and must be carefully adjusted. While various mechanical expedients have heretofore been suggested for this purpose, such prior art devices were relatively elaborate in structure, difficult to adjust and expensive to manufacture.

In view of the foregoing, it is a major object of this invention to provide a magnetic drum storage unit in which each of the magnetic heads may be adjusted precisely relative to the surface coating of the rotary drum.

More specifically, it is an object of the invention to provide a simple and efficient mechanism for accurately and quickly adjusting the distance between the working face of a magnetic head and the surface coating of the drum. The mechanism in accordance with the invention makes it possible to define an air gap whose dimensions as they become very small are capable of simple and more exact adjustment and control than is obtainable with conventional structures. In standard devices, the air gap is generally in the order of .001 inch, whereas with the present invention an air gap of not more than .0006 is preferably used, thereby producing play-back signals of considerably higher intensity than has heretofore been possible.

In non-contact recording the fringing flux in the vicinity of the gap of the ring-shaped head penetrates the carrier and records the pattern of information. The geometry of the core and the gap must be carefully chosen so that the fringing field exhibits the desired properties. The longitudinal component of this field must be as long as possible at the intersection of the equatorial plane of the gap and the surface of the carrier at the specified head-to-carrier clearance. For sharp resolution the flux density must drop off rapidly on either side of the equatorial plane. Where the tracks on the rotating drum are closely spaced, say in the order of twenty per inch, should the magnetic field produced by the head have strong lateral components, cross talk will result. Accordingly, it is another object of this invention to prevent cross talk effects by providing a magnetic head individually shielded whereby the effective field is highly concentrated.

A further object of the invention is to provide a magnetic head having a highly efficient magnetic circuit.

Still another object of the invention is to provide a magnetic drum unit of reliable and efficient design which may be constructed at relatively low cost.

For a better understanding of the invention, as well as other objects and further features thereof, reference is made to the following detailed description to be read in connection with the accompanying drawing, wherein like components on the several views are identified by like reference numerals.

Figure 1:
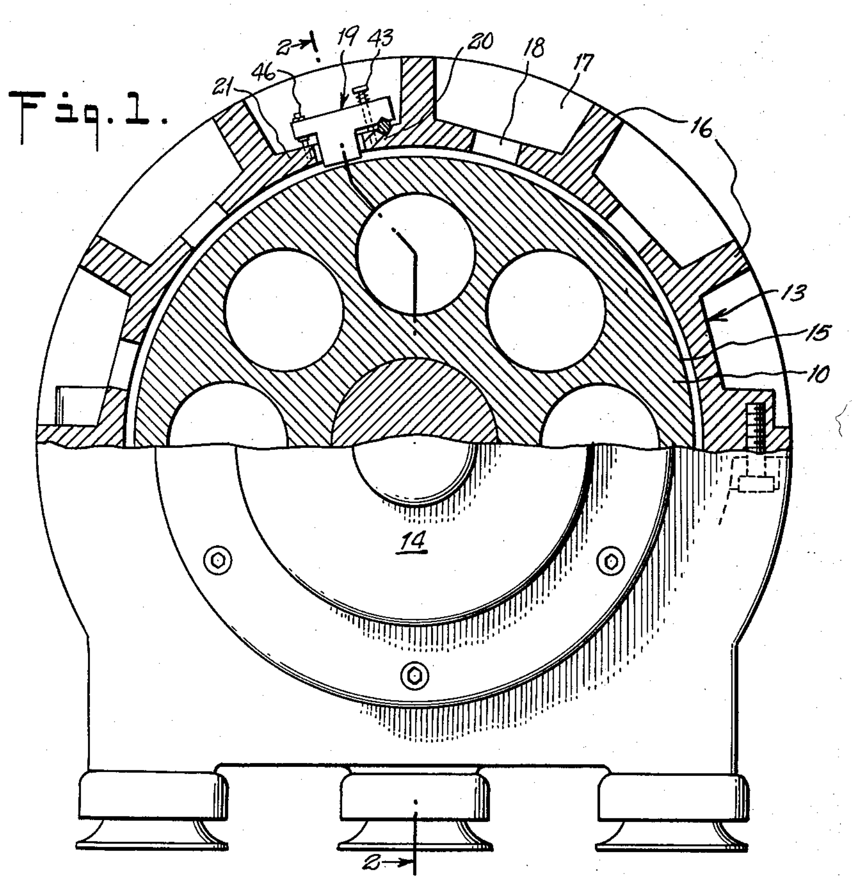
Fig. 1 is an end view, partially in section, of a magnetic drum unit in accordance with the invention.
Figure 2:
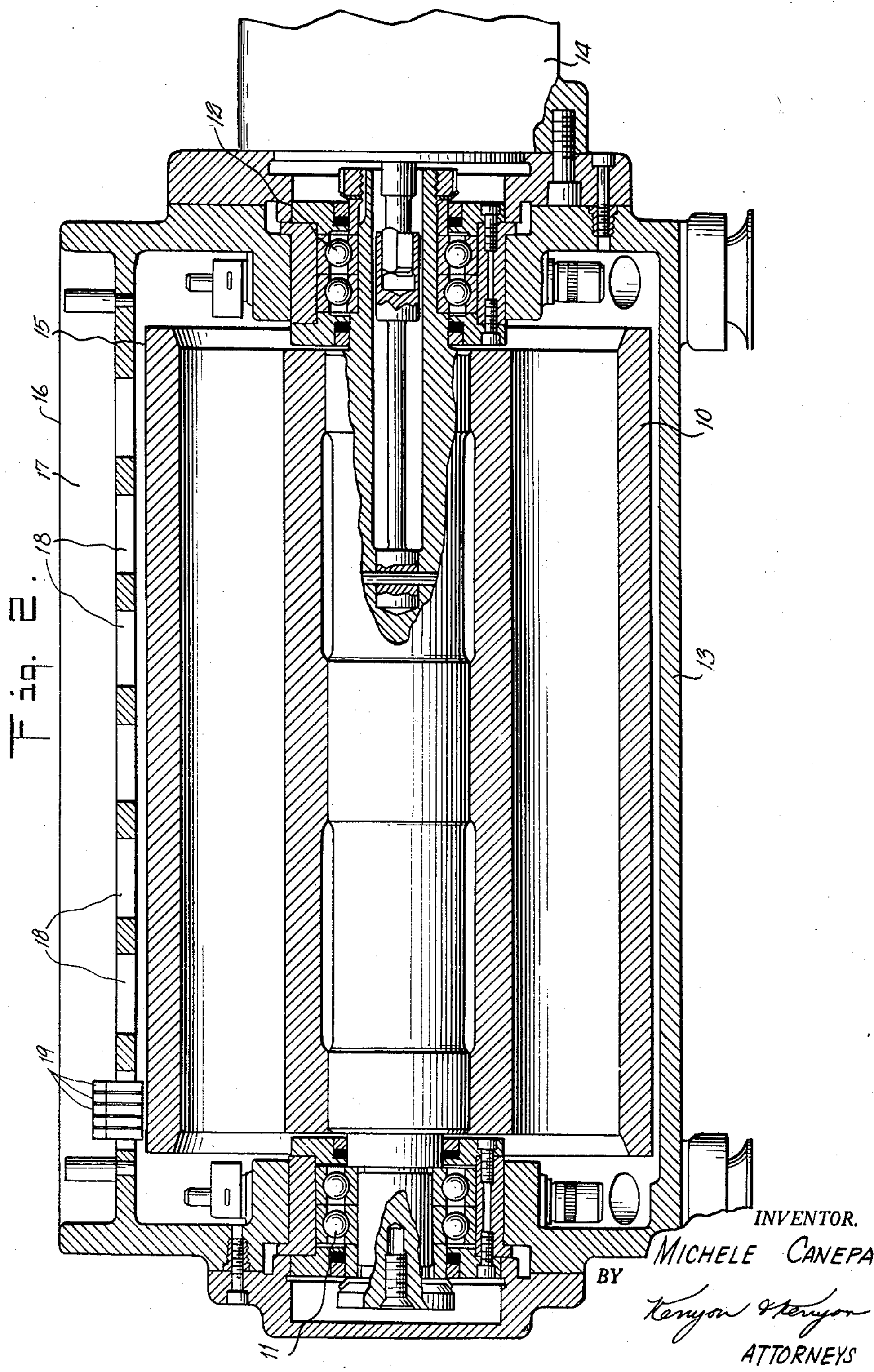
Fig. 2 is a longitudinal section taken along the lines 2—2 of Fig. 1.

Referring now to Figs. 1 and 2, the magnetic drum unit comprises a cylindrical drum 10, rotatably supported at either end by ball bearings 11 and 12 within a generally cylindrical housing 13. The drum 10 is driven at a uniform rate by an electric motor 14. Coated on the surface of the drum is a layer 15 of magnetizable material, preferably a ferromagnetic oxide.

The drum 10 is preferably forged of an aluminum alloy, Alcoa designation B2218, and the housing is sand-cast of an aluminum alloy, Alcoa designation 355T7 (Alcoa Aluminum Handbook, 1956 Ed., published by the Aluminum Corp. of America), the alloys being so matched in their thermal coefficients of expansion as to minimize disparate dimensional changes.

The nominal expansion of aluminum is 12 parts per million per degree Fahrenheit, but, depending upon the alloy, the coefficients of expansion can vary between 11 and 13. Hence at worst, a variation in expansion of as much as 2 millionths of an inch per inch per degree Fahrenheit might occur if incorrectly matched alloys were used. In one practical embodiment of the invention the drum radius is 4.5 inches and the permissible temperature range is 100° Fahrenheit. Thus a variation of as much as $.000002 \times 100 \times 4.5$ inches$=.009$ might arise in the critical pole piece to drum air gap distance if incorrectly matched aluminum alloys were used for drum and housing. A dimensional change of this magnitude will make it virtually impossible to maintain the tolerance desired. Such change is prevented by the use of matched alloys, as indicated.

As best seen in Fig. 1, the interior surface of the wall of housing 13 is concentric with the surface of drum 10 and is spaced therefrom. Projecting radially from the exterior of the housing wall are longitudinally extending ribs 16 which are circumferentially spaced about the housing to define parallel channels 17 whose base is formed by the housing wall. Slots 18 are cut into the wall to accommodate magnetic head assemblies 19, the slots being bounded by ledges 20 and 21 which are spanned by the magnetic head asemblies.

Figure 4:
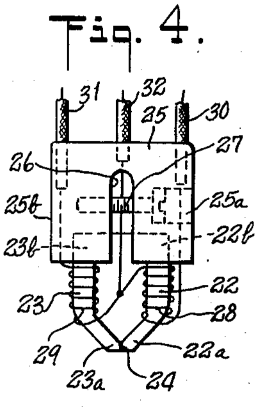
Fig. 4 is a separate view of the magnetic head included in the assembly shown in Fig. 3.
Figure 5:
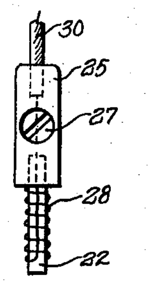
Fig. 5 is a side view of the head shown in Fig. 4.

As shown separately in Figs. 4 and 5, the magnetic head comprises a pole piece constituted by two matched ferrite core halves 22 and 23, the pole faces 22*a* and 23*a* of the halves being separated by a non-magnetic shim 24 whose width determines the dimensions of the magnetic air gap. To maintain co-planar alignment of the two ferrite halves, the feet 22*b* and 23*b* thereof are seated in abutting relation in a recess formed in a pressure support 25, preferably made of nylon or other suitable insulating material.

The support 25 is provided with a slot 26 which divides the support into two relatively flexible legs 25*a* and 25*b*. These legs may be drawn together by means of an adjusting screw 27 which passes through a transverse bore in leg 25*a* and is received in a threaded bore in leg 25*b*. By turning the screw, the legs may be drawn together, thereby compressing the matching pole piece halves 22 and 23 to insure effective magnetic contact therebetween.

The nylon pressure support 25 acts, therefore, to align the pole piece halves and to maintain pressure between the rear abutting faces, as well as to hold the head together during subsequent encapsulation.

Wound about pole piece half 22 is a coil 28, and similarly wound about pole piece half 23 is a coil 29, the two coils being connected in series. One end of coil 28 is connected to a lead 30 extending longitudinally through the pressure support 25, and one end of coil 29 is connected to a lead 31, the junction of the two coils being connected to a lead 32. One of the coils serves as a recording winding and the other as a playback winding.

Figure 3:
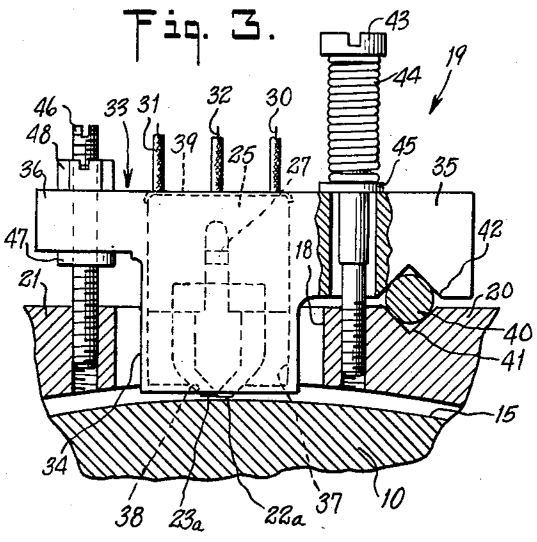
Fig. 3 is an enlarged elevational view of one of the stationary magnetic head assemblies in accordance with the invention.

The magnetic head is nested within a shielded holder, generally designated by numeral 33, which, as shown in Fig. 3, is constituted by a rectangular body portion 34 and opposing wings 35 and 36 extending laterally from the upper end of the body. The body portion 34 is provided with a suitable rectangular recess 37 to accommodate the head. An opening 38 having converging walls corresponding to the taper of the pole piece is formed in the bottom wall of the body portion to expose the pole piece and to permit it to project slightly from below the casing. To encapsulate the head, the recess 37 is proportionally filled with a thermosetting plastic, such as epoxy resin, having a low coefficient of expansion, after which the magnetic head is inserted in the body portion. The plastic is allowed to harden within the container. In this way the head is fabricated into a moisture-proof container.

The holder 33 is formed of a non-magnetic metal acting as a shield or by a metal-plated insulating material providing a shielding effect. The shield is completed by a metal strip 39 enclosing the head in recess 37. Thus, except for the portion of the pole piece projecting through opening 38, the head is completely shielded and the magnetic field is concentrated in the region of the air gap. To shield the magnetic head assemblies from external magnetic linkages shield covers (not shown) may be placed across ribs 16 to enclose the channels 17.

To adjust the position of the magnetic pole piece relative to the magnetically-coated layer 15 on the drum 10, the holder 33 is pivotally mounted on ledge 20 of the housing. This is accomplished by means of a rod 40 of circular cross-section which is set into a V-shaped groove 41 extending longitudinally along the upper surface of ledge 20, the upper portion of the rod being received within an inverted V-shaped groove 42 formed in the lower surface of wing 35 of the holder. Thus the holder is pivotable about rod 40 to vary the effective spacing between the pole piece and the coated surface of the drum. The rod runs the full length of the channel and acts as a common pivot point for all magnetic head assemblies within the channel.

A retaining pressure screw 43 passes through a bore in wing 35 and is threadably received in a bore formed in ledge 20. A helical spring 44 is compressed between the head of screw 43 and a washer 45 resting on the top surface of wing 35. Screw 43 may be tightened to press the wing 35 of the holder against the rod 40.

Passing through a vertical bore in wing 36 and threadably received in ledge 21 is an adjusting stud screw 46 provided with a platform flange 47 on which the undersurface of wing 36 rests. A nut 48 is received on screw 46 to fix the adjusted position of the screw.

When making an adjustment to increase the effective spacing between the pole piece and the drum, screw 46 is turned in a direction causing platform flange 48 to raise the wing 36, thereby causing the holder to pivot upwardly about rod 40 against the pressure of spring 44; the spring normally acting to urge the holder downwardly against the platform flange. The use of mounting screws in the manner shown facilitates the rapid installation and precise adjustment of a magnetic head, or the removal thereof from the unit.

With further regard to the ease, precision, and positive control of adjustment provided by the invention described herein, one additional factor which deserves mention is the choice of screw-thread selected for use with adjusting stud screw 46. One pre-formed screw-thread used is designated "2.6 MA" (International metric). Due to the thread "pitch" of .0177 inch, one-quarter turn of this stud will produce a vertical travel of .002 inch in the critical head-to-carrier clearance. In another embodiment however, a screw-thread of "2 MB" may be specified, in which case due to a fine "pitch" of the screw-thread, one quarter turn of the adjusting stud 46 would produce a vertical travel of .001 inch in the head-to-carrier clearance, thus providing an enhanced degree of precision twice that provided by the present means. Rather than provide threaded bores in the ledges for the screws, unthreaded bores may be used in which steel inserts are placed containing finely threaded bores.

Pivot-rod 40 has a preferred location with respect to the radius of drum 10. For optimum motion, the magnetic head should pivot about an axis which is fixed in one coordinate by a line parallel to and .0006 inch distant from the hypothetical tangent drawn to the surface of the coated drum.

Under the above conditions the magnetic gap between pole faces 22*a* and 23*a* will describe a locus according to the following formula:

$$(1) \qquad [x-h]^2+[y-k]^2=r^2$$

said locus being a portion of a circle (of radius $r=.760$ inch) having its center at ($h=.760$) ($K=R+.0006+y'$) with respect to the center of drum 10, R being the radius of the coated drum, and $y'$ in this case having the value of zero. Thus the locus described under ideal conditions, by the magnetic gap between pole faces 22*a* and 23*a* is described as follows:

$$(2) \qquad [x-.760]^2+[y-4.5026]^2=[.760]^2$$

In one actual embodiment of the invention the magnetic head has a value assigned to $y'$ which is not zero, and hence the locus described by the magnetic gap referred to above does not coincide with the ideal case. The actual value of $y'$ is .388 inch in the magnetic head, and the locus referred to is actually described by the following formula:

$$(3) \qquad [x-.760]^2+[y-4.8906]^2=[.760]^2$$

This means that the magnetic head will not approach the coated drum surface along a true perpendicular. To approach the ideal more closely the axis of rotation of the magnetic head must be lowered (i.e. the value of $y'$ diminished). In that case V-slot 42 will also need to be lowered, and may in fact be accomplished on the lower end of an extension-stud, rather than on the lower face of one wing 35 as at present. That is to say, in place of a pivot rod 40 a stud projecting from the wing 35 may be arranged to be received in slot 45 to pivot the holder.

Each of the channels 17 contains a series of longitudinally spaced slots for the insertion of magnetic head assemblies, the slots in the respective channels being displaced relative to each other to permit a staggered arrangement of heads about the drum.

In practice, if a direct current magnetizing pulse of a given polarity is caused to flow in a winding of the recording head, and the pole piece is held, say, .0006 inch from the coated magnetic drum surface, a molecular reorientation which will result within the coating produces a uniformly north-to-south alignment therein. This condition is arbitrarily stated as representing the "Zero" binary digit. Now if the magnetizing current is reversed in direction, an opposite molecular orientation will be brought about within the surface coating. This condition represents the "One" binary digit.

Thus a direct-current pulse of given polarity flowing through a head placed over a particular area of any track will create within that area a permanently magnetized condition of given orientation, the area being designated as a "bit." Active information may be stored in successive tracks and each track may be divided circumferentially into register sections which are surface areas designated for information storage. For example, a track capable of containing 1192 bits may thus be formed beneath each magnetic head and the track may further be divided circumferentially into 50 register areas designated for individual account storage.

Assuming a drum speed of 3600 r.p.m., the optimum air gap between the working faces of the pole pieces and the drum surface must be kept constant with a maximum variation of plus or minus .0001 inch. This dimension is critical, for the efficiency of the magnetic path through the recording and play-back heads diminishes greatly for any increase in air gap in the path. On the other hand, the strength of magnetization imposed within the drum coating when recording magnetic pole faces are held too close to the drum may be so great as to prevent complete subsequent erasure, and may impress spurious signals on adjacent tracks. The head-to-carrier clearance observed in the mechanical adjustment of this air gap is determined roughly by means of a removable "shim" and then finally verified electrically. In order to obtain higher play-back signals the nominal air gap distance is adjusted so that it is no more than .0006 inch. And in this case the recording currents should be adjusted to avoid the excessively intense or diffused magnetization of the coating incident to an excessively strong magnetizing flux. The adjusting mechanism in accordance with the invention facilitates an exact adjustment to meet predetermined requirements.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a magnetic drum storage unit including a housing and a magnetic drum rotatably supported therein, said housing having an opening therein to afford access to the peripheral surface of said drum, a magnetic head assembly having a pole piece, means pivotally mounting said assembly on said housing whereby said pole piece projects through said opening and is positioned adjacent the periphery of said drum to define an air gap, and means to adjust the angular position of said assembly on said pivotal mounting with reference to the radius of the drum, thereby to adjust the air gap spacing between said pole piece and said drum.

2. A unit, as set forth in claim 1, including a plurality of said magnetic head assemblies and a pivot rod therefor mounted on said housing.

3. In a magnetic drum storage unit, including a cylindrical housing having radial ribs projecting therefrom to define circumferentially arranged longitudinal channels, a cylindrical drum coaxially disposed and rotatably supported within said housing and having a magnetic surface, said channels having openings therein to provide access to said drum, magnetic head assemblies supported within said channels to act on said drum through said opening means pivotally to support each of said assemblies on said housing, and means to adjust the angular position of each pivoted assembly relative to the radius of the drum whereby the position of said assembly relative to said drum may be raised.

4. A unit, as set forth in claim 3, further including metal covers spanning said ribs to shield said assemblies from external fields.

5. A unit, as set forth in claim 3, wherein said drum is forged of a first aluminum alloy and said housing is cast of a second aluminum alloy, said alloys being so matched in their thermal coefficients of expansion as to minimize disparate dimensional changes.

6. In a magnetic drum unit, a rotary drum supported within a housing provided with an opening through which access is had to the drum, said opening being bounded by ledges, a magnetic head assembly pivotally supported between said ledges and including a holder having a body portion and opposing wings extending laterally therefrom, said body portion extending through said opening and containing a magnetic head, means pivotally mounting one wing of said holder against one of said ledges, and adjustable means for connecting the other wing to the other ledge to maintain a given angular position of said holder about said pivotal mounting relative to the radius of the drum.

7. In a magnetic drum unit, a rotary drum supported within a housing provided with an opening through which access is had to the magnetic surface of the drum, said opening being bounded by first and second ledges, a magnetic head assembly supported on said housing and including a holder having a body portion and opposing first and second wings extending laterally therefrom, a pivoting rod extending along a groove formed in said first ledges, the undersurface of the first wing having a matching groove formed therein to accommodate said rod, a retaining screw passing through said first wing and threadably received by a bore in said first ledge, a spring interposed between the head of said screw and the top surface of said first wing, and an adjusting screw passing through said second wing and threadably received in said second ledge to vary the angular position of the assembly relative to the radius of the drum.

References Cited in the file of this patent

UNITED STATES PATENTS

| | | |
|---|---|---|
| 2,475,421 | Camras | July 5, 1949 |
| 2,633,504 | Palle-Finn Beer | Mar. 31, 1953 |
| 2,644,856 | Pettus | July 7, 1953 |
| 2,756,280 | Rettinger | July 24, 1956 |
| 2,790,966 | Malbon et al. | Apr. 30, 1957 |
| 2,794,180 | Berger et al. | May 28, 1957 |